United States Patent
Kim (10) Patent No.: US 7,450,650 B2
(45) Date of Patent: Nov. 11, 2008

(54) UWB PULSE SEQUENCE GENERATION APPARATUS AND METHOD, AND DATA COMMUNICATION APPARATUS AND METHOD USING THE UWB PULSE SEQUENCE

(75) Inventor: Nam-hyong Kim, Suwon-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 789 days.

(21) Appl. No.: 10/735,745

(22) Filed: Dec. 16, 2003

(65) Prior Publication Data
US 2004/0179577 A1    Sep. 16, 2004

(30) Foreign Application Priority Data
Mar. 11, 2003 (KR) ............... 10-2003-0015194

(51) Int. Cl.
H04L 27/00 (2006.01)
(52) U.S. Cl. .................................. 375/259
(58) Field of Classification Search ........... 375/140, 375/141, 146, 130, 242, 295, 353, 373, 376, 375/377, 238, 268, 269, 278–280; 455/91
See application file for complete search history.

(56) References Cited

U.S. PATENT DOCUMENTS

| | | | | |
|---|---|---|---|---|
| 5,257,284 A | * | 10/1993 | Skudera et al. | 375/139 |
| 6,091,932 A | * | 7/2000 | Langlais | 725/111 |
| 6,937,667 B1 | * | 8/2005 | Fullerton et al. | 375/295 |
| 2001/0053175 A1 | | 12/2001 | Hoctor et al. | |
| 2002/0190881 A1 | * | 12/2002 | Low et al. | 341/133 |
| 2002/0196845 A1 | * | 12/2002 | Richards et al. | 375/239 |
| 2003/0053555 A1 | * | 3/2003 | McCorkle et al. | 375/295 |

FOREIGN PATENT DOCUMENTS

| | | |
|---|---|---|
| CN | 1394422 A | 1/2003 |
| KR | 2001-0085755 A | 9/2001 |
| WO | WO 01/73712 A2 | 10/2001 |
| WO | WO 01/93441 A1 | 12/2001 |
| WO | WO 02/089345 A1 | 11/2002 |

* cited by examiner

*Primary Examiner*—Mohammad Ghayour
*Assistant Examiner*—Vineeta S Panwalkar
(74) *Attorney, Agent, or Firm*—Sughrue Mion, PLLC

(57) ABSTRACT

Provided is a wireless data transmitting/receiving apparatus and method using an UltraWide Band (UWB). The apparatus includes a random number generator; a random-interval pulse sequence generator; a template pulse sequence generator which generates a reference template pulse sequence used to detect the start point of the random-interval pulse sequence and generates pulse sequences for a signal 0 and a signal 1 by changing the widths of pulses; a random number sequence detector which receives the random-interval pulse sequence and detects information regarding the start point of a random number sequence, using the reference template pulse sequence; and a comparator which compares the pulse sequences for the signal 0 and the signal 1, and determines whether the value of the received random-interval pulse sequence is 0 or 1. Accordingly, it is possible to easily detect information regarding the start point of a pulse sequence while maintaining a processing gain.

26 Claims, 7 Drawing Sheets

FIG. 6

UWB PULSE SEQUENCE GENERATION APPARATUS AND METHOD, AND DATA COMMUNICATION APPARATUS AND METHOD USING THE UWB PULSE SEQUENCE

This application claims the priority of Korean Patent Application No. 2003-15194, filed on Mar. 11, 2003, in the Korean Intellectual Property Office, the disclosure of which is incorporated herein in its entirety by reference.

BACKGROUND OF THE INVENTION

1. Field of the Invention

The present invention relates to wireless communication techniques, and more particularly, to a wireless data transmitting and receiving apparatus and method using an UltraWide Band (hereinafter referred to as 'UWB').

2. Description of the Related Art

A wireless data transmission technique, which is adopted by cellular mobile communications, satellite communications, and television broadcast, transmits data by changing the waveform of a base frequency called a radio-frequency (RF) carrier and including the data into the RF carrier. A UWB technique is a data transmission method based on representation of data with 0's and 1's by repeatedly transmitting a pulse, which is an electric signal with a predetermined cycle and waveform, at intervals of time, which is shorter than 1 nanoseconds, without using the RF carrier.

In other words, the UWB technique transmits data using the pulse that acts as Morse code. When using very short pulses at predetermined intervals of time, e.g., per several hundred picoseconds, the pulses are modulated by a short length ±Dt of time before and after a predetermined time. When a pulse is modulated by a length –Dt of time, data is transmitted as 0's, and when a pulse is modulated by a length +Dt of time, data is transmitted as 1's. Transmission of coded pulses at precise points of time allows transmission of a lot of data and further increases the number of mobile users, theoretically without any restrictions.

Figure 1:
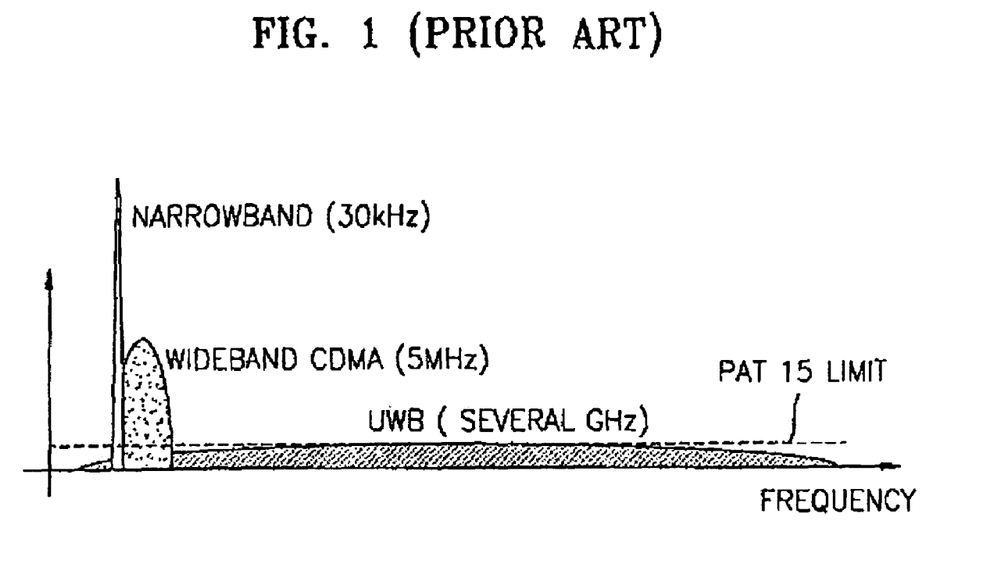
FIG. 1 is a graph illustrating the frequency spectrums of signals used in a narrowband communications system, a wideband Code Division Multiple Access (CDMA) system, and a UWB communications system.

FIG. 1 is a graph illustrating frequency spectrums of signals used in a narrow-band communications system, a wideband CDMA system, and a UWB communications system. FIG. 1 illustrates the frequency spectrums of three different communications systems of the same output power. The three different communications systems include a narrowband communications system, a broadband Code Division Multiple Access (CDMA) system, and a UWB communications system. Referring to FIG. 1, compared to the narrowband communications system and the broadband CDMA system, the UWB communications system has lower density of spectrum power at a wide frequency band and thus can share frequencies with the existing wireless communications systems without interfering with the existing wireless communications systems.

The UWB communications system uses pulses with narrow widths of several nanoseconds or picoseconds. Accordingly, the system has very low density of spectrum power at an ultra wide frequency band, provides a high-security, a high data transmission rate, and undergoes less problems due to multi-path transmission. In particular, unlike the conventional wireless system, the UWB communications system is capable of conducting communications at a base band frequency without, carriers. Therefore, the structure of the UWB communications system is simple and makes it possible to manufacture a transceiver included in this system at a low cost.

That is, the UWB communications system transmits signal energy by dispersing the spectrum of the signal energy at a frequency of several GHz bandwidths not to interfere with other communications systems, thereby enabling communications without interfering with narrowband signals and irrespective of frequencies. The spectrum of a frequency domain is closely related to the shape of a signal waveform of a temporal domain. A sine wave has a large energy value at a particular frequency band, but an impulse has a uniform energy distribution over a wide frequency band. Thus, a pulse with a width of several nanoseconds or picoseconds is repeatedly used in the UWB communications.

Figure 2:
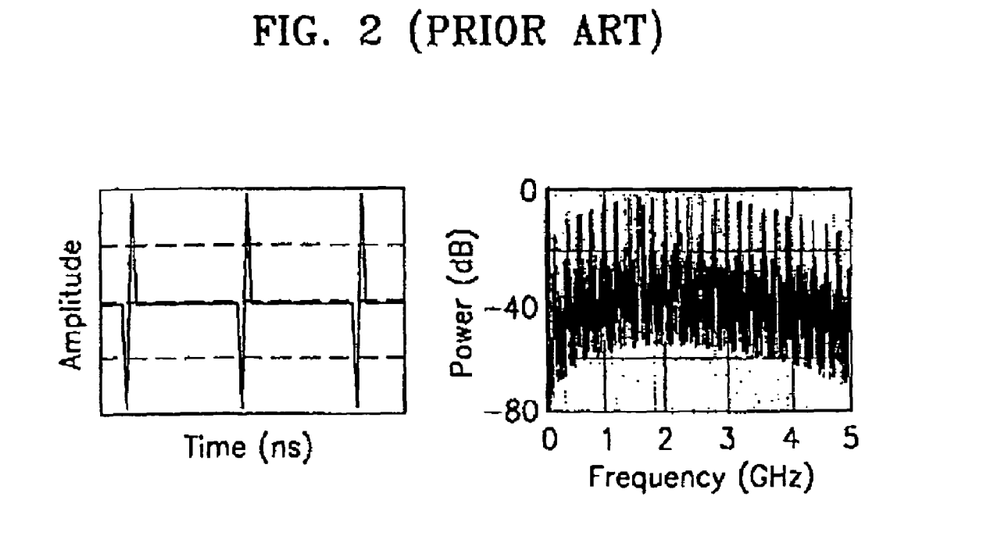
FIG. 2 illustrates a pulse signal with uniform intervals and the spectrum of the pulse signal.

FIG. 2 illustrates a pulse signal with a uniform amplitude distribution and the spectrum of the pulse signal.

When using only one pulse, an ultra low density of spectrum power appears as wideband noise over an ultra wide frequency band. However, as apparent from FIG. 2, if communications are made using a pulse with a uniform interval, the uniform periodicity of pulse causes an energy spark (comb line) to occur in the spectrum in a frequency domain. The energy spark may interfere with narrowband signals used in other communications and should be removed or minimized. To prevent the uniform periodicity of a pulse sequence, there is a need to change the interval of time between adjacent pulses.

A pulse and a pulse sequence, which is obtained by modulating the pulse, are required to transmit data 0' and 1' using a pulse. In general, a pulse is modulated using On-Off Keying (OFK), Pulse Amplitude Modulation (PAM), and Pulse Position Modulation (PPM).

Figure 3:
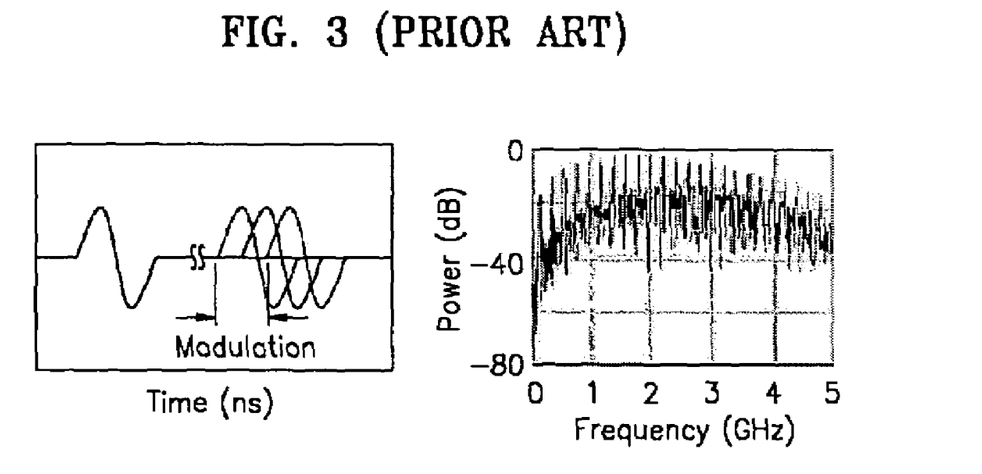
FIG. 3 illustrates pulse position modulation (PPM) for UWB signal transmission and the spectrum of a signal that undergoes PPM.

FIG. 3 illustrates diagrams explaining PPM for transmission of a UWB signal and the spectrum of a position-modulated pulse. More specifically, the left drawing in FIG. 3 illustrates a method of changing the position of a pulse using PPM so as to make the pulse representation of signals 0 and 1. That is, a signal arriving before a reference point of time is expressed as 0's and a signal arriving after the reference point of time is expressed as 1's. The right drawing of FIG. 3 illustrates the spectrum of the pulse, the position of which is modulated using PPM. Referring to FIG. 3, RF energy of the pulse is more uniformly distributed over all frequency bands than the energy of the pulse shown in FIG. 2. Therefore, the existing narrowband communications system is less affected by the RF energy of FIG. 3. However, since only a portion of a pulse can be modulated using PPM, the position-modulated pulse assumes a similar shape to the spectrum of the previously explained pulse sequence having uniform duration. In conclusion, it is possible to make the spectrum uniform to some degree, but it is difficult to prevent the occurrence of the energy spark.

Figure 4:
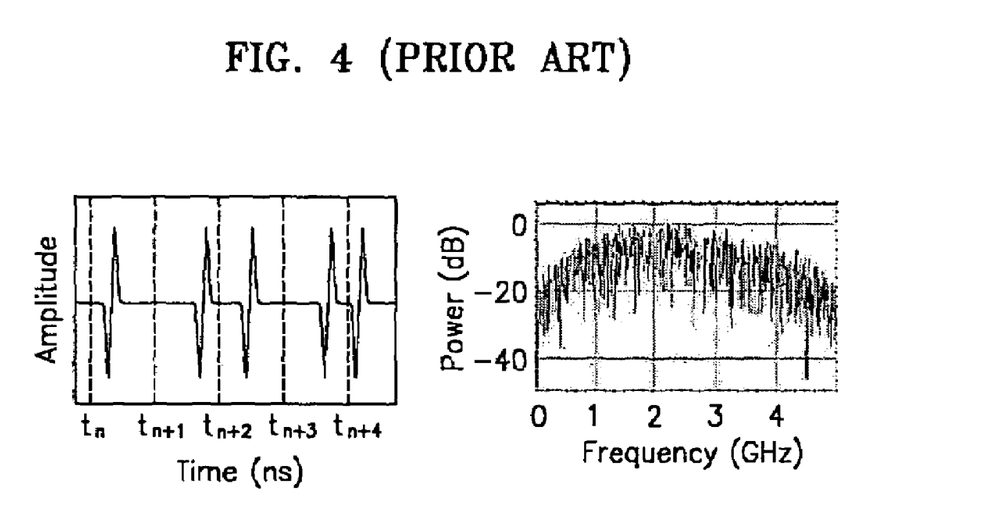
FIG. 4 illustrates a pulse with random intervals and the spectrum of the pulse.

FIG. 4 illustrates a pulse with random interval and the spectrum of the pulse. More specifically, the left drawing in FIG. 4 illustrates a waveform of a position-modulated pulse with random intervals and the right drawing illustrates the energy spectrum of the pulse with random intervals.

When a transmitter generates a pulse with random interval and transmits it to a receiver via an antenna, the receiver creates a template pulse sequence representation of 0's or 1's and compares it with the received pulse sequence, estimates and acquires information regarding the received pulse sequence with random intervals based on the result of the comparison, and compares the received pulse and the template pulse sequence and obtains data from the received pulse based on the acquired information.

Therefore, the transmitter includes a random number generator that generates a random number sequence and the receiver also includes a random number generator that generates the same random number sequence. However, it is required to synchronize the random number sequence output from the transmitter and the random number sequence output from the receiver in order to interpret the received data.

Figure 5:
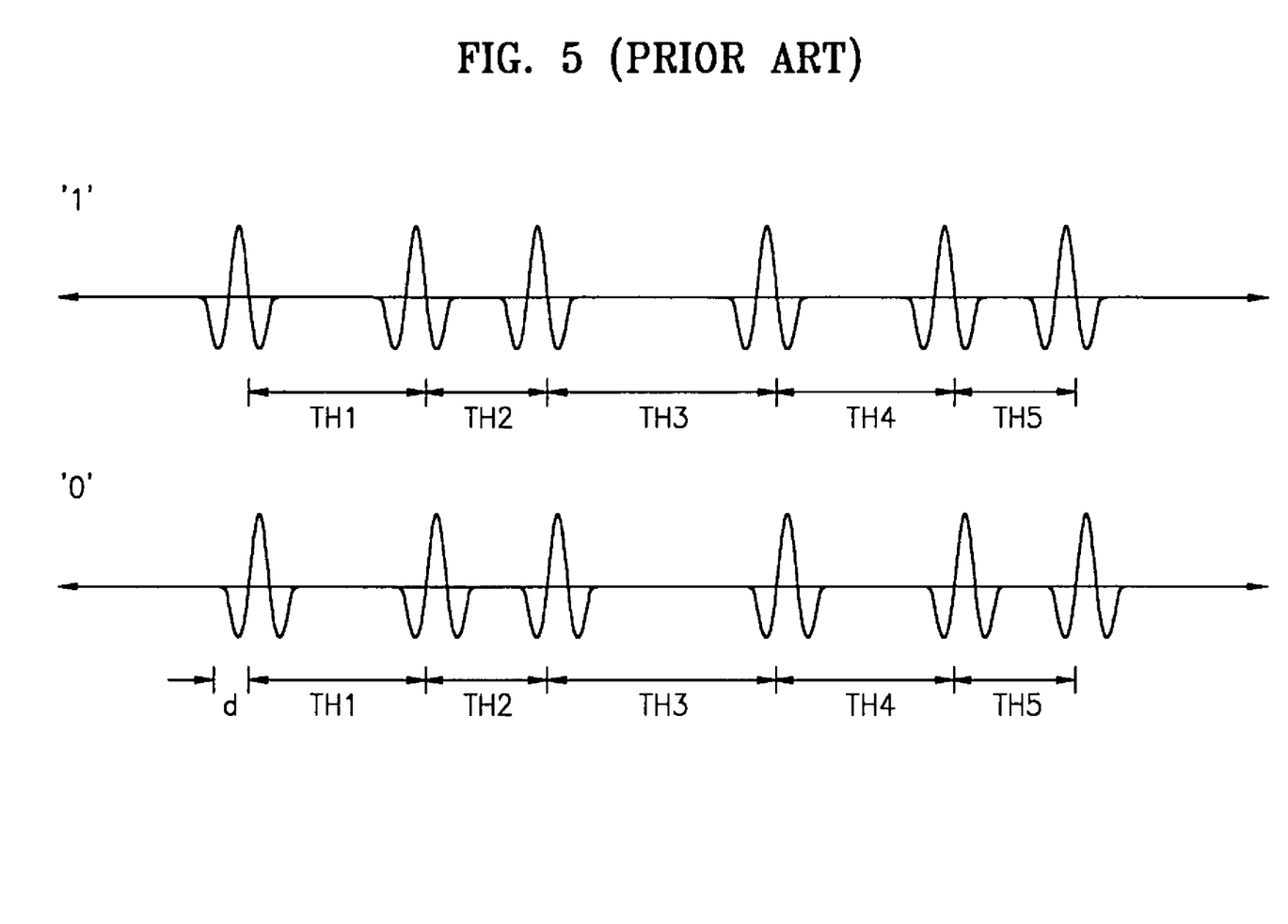
FIG. 5 illustrates pulse sequences with random intervals.

FIG. 5 illustrates pulse sequences with random intervals. The synchronization represents that a transmitter and a receiver related to data transmission are to match a random-interval pulse sequence of a random number sequence generated by the receiver with a random-interval pulse sequence of a random number sequence generated by the transmitter, so as to check whether these random-interval pulse sequences are the same or not. If the energy distribution of the pulse sequence from the transmitter matches that of the pulse sequence from the receiver by 95% or more, these pulse sequences are considered as being identical with each other and information regarding the random number sequence used is stored.

Since the width of a UWB pulse is very small, its pulse energy is too slight to be detected. Thus, several pulses are sent to transmit a piece of data, thereby obtaining a favorable processing gain. That is, even if some of the sent pulses are lost, it is possible to restore the original information with the remaining pulses. However, a high-precision timer is further required to modulate and demodulate the UWB pulse, and it is difficult to restore the original information when only a portion of the UWB pulse changes.

SUMMARY OF THE INVENTION

The present invention provides a UWB pulse sequence generation apparatus and method capable of easily detecting information regarding the start position of a pulse sequence, i.e., the synchronous positions of transmitted pulse sequences, while maintaining a processing gain, and a wireless data transmitting/receiving apparatus and method using the generated UWB pulse sequence.

According to an aspect of the present invention, there is provided a wireless data transmitting and receiving system comprising: a random number generator which generates a random number sequence; a random-interval pulse sequence generator which generates a random-interval pulse sequence of data, which is to be transmitted, using the random number sequence generated by the random number generator; a template pulse sequence generator which generates a reference template pulse sequence used to detect the start point of the random-interval pulse sequence and generates pulse sequences for a signal 0 and a signal 1 by changing the widths of pulses; a random number sequence detector which receives the random-interval pulse sequence and detects information regarding the start point of a random number sequence, which is used to make the received random-interval pulse sequence, using the reference template pulse sequence; and a comparator which compares the pulse sequences for the signal 0 and the signal 1 based on the start point information regarding the random number sequence with the received random-interval pulse sequence, and determines whether the value of the received random-interval pulse sequence is 0 or 1.

According to another aspect of the present invention, there is provided a wireless data receiving apparatus comprising a template pulse sequence generator which generates a reference template pulse sequence used to detect the start point of a received random-interval pulse sequence and generates a pulse sequence for a signal 0 and a pulse sequence for a signal 1 by differently adjusting the widths of pulses; a random number sequence detector which receives the random-interval pulse sequence and detects information regarding the start point of a random number sequence used to generate the random-interval pulse sequence; and a comparator which compares the received random-interval pulse sequence with the pulse sequences for the signal 0 and the signal 1, which are generated by the template pulse sequence generator, based on the start point information detected by the random number sequence detector and determines whether the value of the received random-interval pulse sequence is 0 or 1.

According to yet another aspect of the present invention, there is provided a UWB pulse sequence generation apparatus comprising a first pulse sequence generator which generates a first UWB pulse sequence using a predetermined random number sequence; and a second pulse sequence generator which generates a second UWB pulse sequence that is out of phase to the first UWB pulse sequence by a predetermined degree.

According to still another aspect of the present invention, there is provided a UWB pulse sequence generator comprising a first pulse sequence generator which generates a first UWB pulse sequence using a predetermined random number sequence; and a second pulse generator which generates a second UWB pulse sequence whose pulse width is wider than the pulse width of the first UWB pulse sequence by a predetermined degree.

According to still another aspect of the present invention, there is provided a wireless data transmitting/receiving method comprising: (a) generating a random number sequence; (b) generating a random-interval pulse sequence for data, which is to be transmitted, using the random number sequence; (c) generating a reference template pulse sequence used to detect the start point of the received random-interval pulse sequence; (d) receiving the random-interval pulse sequence and detecting information regarding the start point of a random number sequence used to generate the received random-interval pulse sequence, using the reference template pulse sequence; (e) generating reference pulse sequences for a signal 0 and a signal 1 based on the start point information regarding the random number sequence; and (f) comparing the reference pulse sequences for the signal 0 and the signal 1 with the received random-interval pulse sequence and determining whether the value of the received random-interval pulse sequence is 0 or 1 based on the result of comparison.

According to still another aspect of the present invention, there is provided a wireless data receiving method comprising: (a) generating a reference template pulse sequence used to detect the start point of a received random-interval pulse sequence; (b) receiving the random-interval pulse sequence and detecting information regarding the start point of a random number sequence used to generate the received random-interval pulse sequence using the reference template pulse sequence; (c) generating reference pulse sequences for a signal 0 and a signal 1 based on the start point information regarding the random number sequence; and (d) comparing the reference pulse sequences for the signal 0 and the signal 1 with the received random-interval pulse sequence and determining whether the value of the received random-interval pulse sequence is 0 or 1.

According to still another aspect of the present invention, there is provided a UWB pulse sequence generation method comprising: (a) generating a first UWB pulse sequence using a predetermined random number sequence; and (b) generating a second UWB pulse sequence to be out of phase with the first UWB pulse sequence.

According to still another aspect of the present invention, there is provided a UWB pulse sequence generation method comprising (a) generating a first UWB pulse sequence using a predetermined random number sequence; and (b) generating a second UWB pulse sequence whose pulse width is wider than the pulse width of the first UWB pulse sequence by a predetermined degree.

According to still another aspect of the present invention, there is provided a computer readable recording medium on which a program that executes the above method in a computer is recorded.

BRIEF DESCRIPTION OF THE DRAWINGS

The above and other aspects and advantages of the present invention will become more apparent by describing in detail exemplary embodiments thereof with reference to the attached drawings in which.

DETAILED DESCRIPTION OF THE ILLUSTRATIVE, NONLIMITING EMBODIMENTS OF THE INVENTION

Hereinafter, exemplary embodiments of the present invention will be described in detail with reference to the accompanying drawings.

Figure 6:
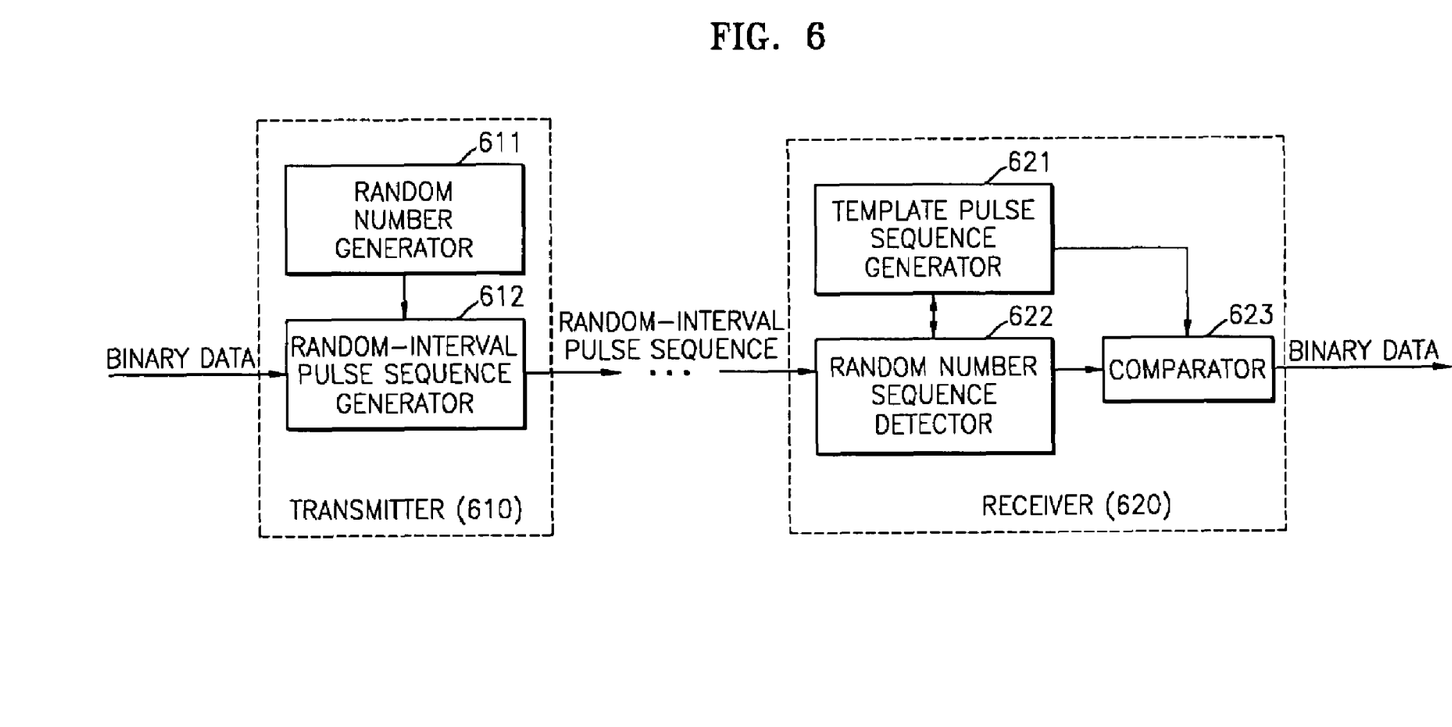
FIG. 6 is a block diagram illustrating a structure of a UWB transmitting and receiving system according to an exemplary embodiment of the present invention.

FIG. 6 is a block diagram illustrating a structure of a UWB transmitting and receiving system according to an exemplary embodiment of the present invention. Referring to FIG. 6, the UWB transmitting and receiving system includes a transmitter 610 and a receiver 620. The transmitter 610 generates a time hopping pulse sequence for binary data to be transmitted and transmits the data to a wireless channel via an antenna. The transmitter 610 includes a random number generator 611 that generates a random number sequence used to make a pulse sequence with random intervals; and a random interval pulse sequence generator 612 (hereinafter referred to as the pulse sequence generator 612') that receives binary data to be transmitted, performs pulse modulation based on information regarding the random number sequence generated by the random number generator 611, and generates a pulse sequence with random intervals. To make a pulse sequence with random intervals using the generated random number sequence, a pulse is generated after a unit interval of time corresponding to the generated random number. Therefore, since the start position of a pulse depends on a random number, it is possible to generate the pulse at a random position.

The receiver 620 includes a template pulse sequence generator 621, a random number sequence detector 622, and a comparator 623. The template pulse sequence generator 621 also includes a random number generator (not shown). A random number sequence generated by the random number generator is the same as the random number sequence that is used to make a pulse sequence with random intervals by the transmitter 610. A random number sequence detector 622, which will later be described in detail, detects the start position of the pulse sequence.

The random number detector 622 compares a random-interval pulse sequence, which is received via wireless transmission, with a template pulse sequence generated by the template pulse sequence generator 621 and determines whether these pulse sequences are the same, so as to detect the start position of the pulse sequence.

The reason for synchronizing the transmitter 610 and the receiver 620 related to data transmission is to match the random-interval pulse sequence generated by the receiver 620 with the random-interval pulse sequence generated by the transmitter 610, so as to check whether or not these pulse sequences are the same or not. If the energy distribution of the pulse sequence from the transmitter 610 matches that of the pulse sequence from the receiver 620 by 95% or more, these pulse sequences are considered as being the same and information regarding the random number sequence is transmitted to the template pulse sequence generator 621. Then, the template pulse sequence generator 621 receives the information and generates reference pulse sequences representing 0's and 1's.

The reference pulse sequences representing 0's or 1's are generated by adjusting the widths of pulses to distinguish between the reference pulse sequences representing 0's and 1's, unlike the conventional way of delaying generation of a pulse by a predetermined interval of time. The signals 0 and 1 will be later described with reference to FIGS. 7 and 8.

The comparator 623 compares the pulse sequences representing 0's and 1's, which are generated by the template pulse sequence generator 621, with the received pulse sequence and determines whether received data is 0 or 1.

Figure 7:
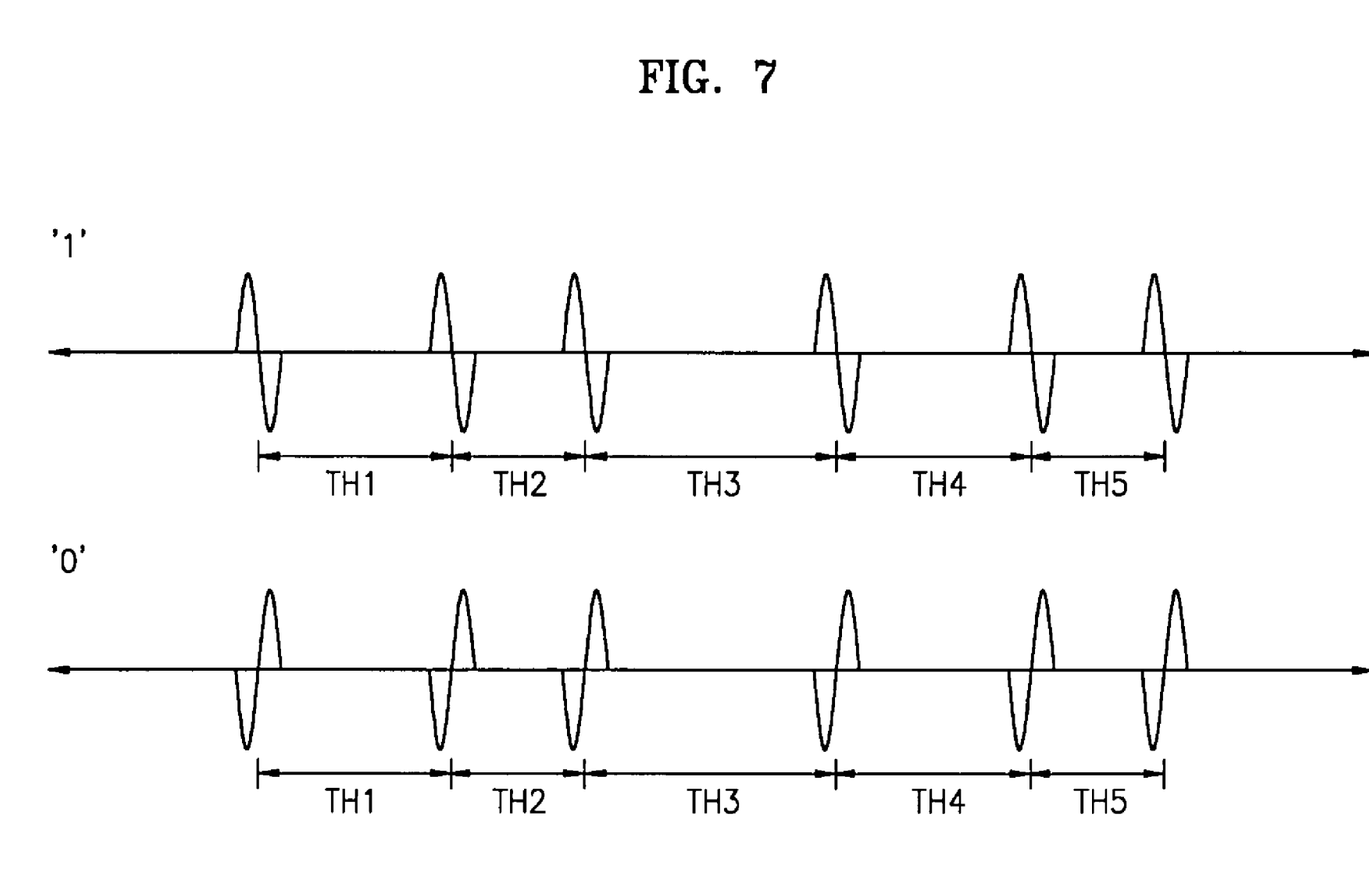
FIG. 7 illustrates signals 0 and 1 obtained by changing the phase of a pulse by 180 degree.

FIG. 7 illustrates signals 0 and 1 by moving the phase of a random-interval pulse by degree 180. As shown in FIG. 7, a change in the phase of the pulse makes it easy to detect the start position of the pulse while maintaining the characteristics of the random-interval pulse. In FIG. 7, TH1 through TH5 denote random intervals of the pulse.

Figure 8:
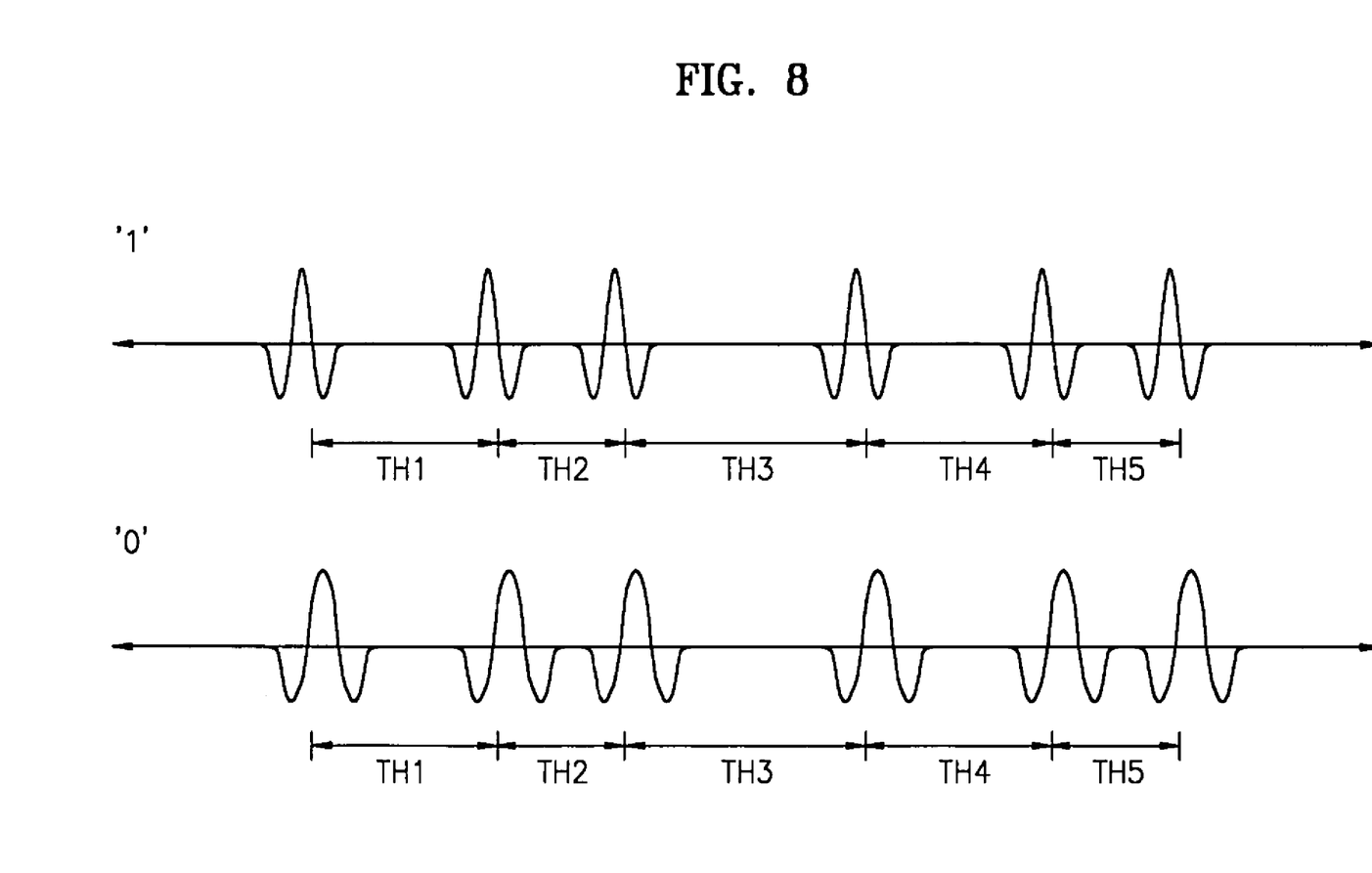
FIG. 8 illustrates signals 0 and 1 obtained by changing the width of a pulse.

FIG. 8 illustrates signals 0 and 1 obtained by changing the widths of a pulse. As shown in FIG. 8, it is easier to detect the start position of the pulse and tell the difference between signals 0 and 1 by changing the width of a pulse than when detecting the start position of a time-delayed pulse.

Figure 9:
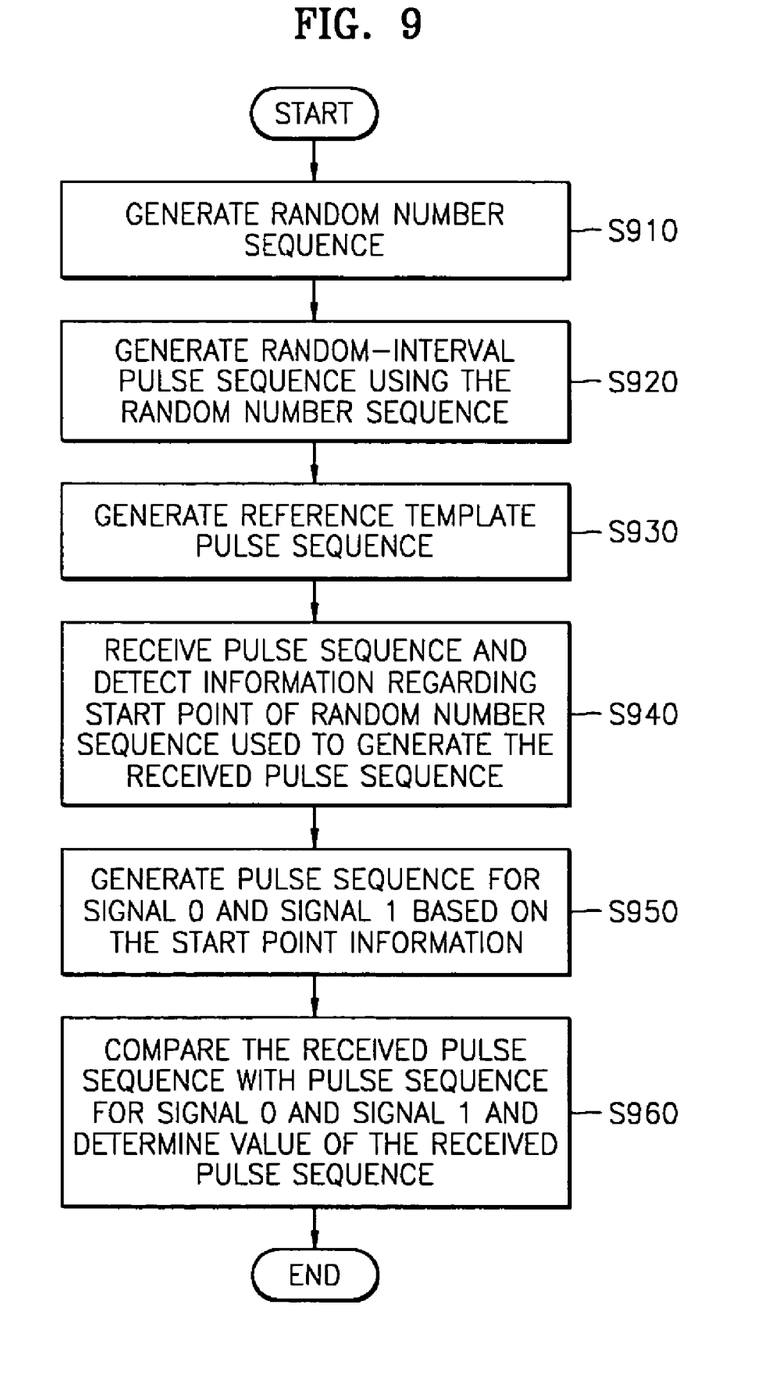
FIG. 9 is a flowchart illustrating a wireless data transmitting and receiving method according to an exemplary embodiment of the present invention.

FIG. 9 is a flowchart illustrating a wireless data transmitting and receiving method according to an exemplary embodiment of the present invention. Referring to FIG. 9, a random number sequence is generated (S910). Next, a random-interval pulse sequence regarding data to be transmitted is generated using the generated random number sequence (S920). The random-interval pulse sequence is generated at a UWB, using Pulse Position Modulation (PPM).

Next, a reference template pulse sequence, which is used to detect the start position of the received random-interval pulse sequence, is generated (S930). The reference template pulse sequence is generated based on information regarding the same random number sequence as a transmitter uses to make the random-interval pulse sequence. Next, reference pulse sequences corresponding to signals 0 and 1 are generated by delaying the start points of pulses of the pulse sequence by predetermined lengths of time. In detail, each pulse of the pulse sequence corresponding to the signal 0 is generated to be out of phase with each pulse of the pulse sequence corresponding to the signal 1 by 180 degrees. In this case, the phase of each pulse of the pulse sequence for the signal 0 and the phase of each pulse of the pulse sequence for the signal 1 may be set to be different from each other, using a BiPhase Shifting Keying (BPSK) method or a Quadrature Phase Shift Keying (QPSK) method.

Alternatively, the reference pulse sequences may be generated such that the width of each pulse of the pulse train corresponding to the signal 0 is different from that of each pulse of the pulse train corresponding to the signal 1 to a predetermined degree, thereby distinguishing between the reference pulse sequences representing 0's and 1's. That is, the widths of pulses are adjusted to distinguish between the signal 0 and the signal 1.

Next, the random-interval pulse sequence is received and information regarding the start point of the random number sequence, which is used to make the received random-interval pulse sequence, is detected using the reference template pulse sequence (S940). More specifically, the start point information is detected by checking the degree of which the energy distribution of the random-interval pulse sequence matches that of the reference template pulse sequence and determining whether the degree of match exceeds a predetermined critical value, based on the result of comparison.

Next, pulse sequences for the signals 0 and 1 are generated based on the start point information regarding the random number sequence (S950).

Next, the pulse sequences for the signals 0 and 1 are compared with the received random-interval pulse sequence, so as to determine whether the value of the random-interval pulse sequence is 0 or 1 (S960).

As described above, a wireless data transmitting and receiving method and apparatus using a pulse sequence generation apparatus and method, according to the present invention, enables information regarding the start point of a pulse sequence to be easily detected while maintaining a processing gain.

The present invention can be embodied as a computer readable code in a computer readable medium. Here, the computer readable medium may be any recording apparatus capable of storing data that is read by a computer system, e.g., a read-only memory (ROM), a random access memory (RAM), a compact disc (CD)-ROM, a magnetic tape, a floppy disk, an optical data storage device, and so on. Also, the computer readable medium may be a carrier wave that transmits data via the Internet, for example. The computer readable recording medium can be distributed among computer systems that are interconnected through a network, and the present invention may be stored and implemented as a computer readable code in the distributed system.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A data transmitting and receiving system comprising:
    a random number generator which generates a random number sequence;
    a random-interval pulse sequence generator which generates a random-interval pulse sequence of data, which is to be transmitted, using the random number sequence generated by the random number generator;
    a template pulse sequence generator which generates a reference template pulse sequence used to detect the start point of the random-interval pulse sequence and generates pulse sequences for a signal 0 and a signal 1;
    a random number sequence detector which receives the random-interval pulse sequence and detects information regarding the start point of a random number sequence, which is used to make the received random-interval pulse sequence, using the reference template pulse sequence; and
    a comparator which compares the pulse sequences for the signal 0 and the signal 1 based on the start point information regarding the random number sequence with the received random-interval pulse sequence, and determines whether the value of the received random-interval pulse sequence is 0 or 1.

2. The system of claim 1, wherein the random-interval pulse sequence is generated at an Ultra Wide Band (UWB).

3. The system of claim 1, wherein the random-interval pulse sequence generator generates the random-interval pulse sequence using pulse position modulation.

4. The system of claim 1, wherein the template pulse sequence generator generates the reference template pulse sequence based on information regarding the same random number sequence as a transmitter uses to generate the random-interval pulse sequence.

5. The system of claim 1, wherein the random number sequence detector detects the start point information regarding the random number sequence by checking the degree of which the energy distribution of the spectrum of the received random-interval pulse sequence matches of the energy distribution of the spectrum of the reference template pulse sequence, which is generated by the template pulse sequence generator, and determining whether the degree of match exceeds a predetermined critical value.

6. The system of claim 1, wherein the template pulse sequence generator generates the pulse sequences such that each pulse of the pulse sequence corresponding to the signal 0 is out of phase with each pulse of the pulse sequence corresponding to the signal 1 by a predetermined degree.

7. The system of claim 1, wherein the template pulse sequence generator generates reference pulse sequences by adjusting the widths of the pulses of the pulse sequence for the signal 0 to be different from the widths of the pulse of the pulse sequence for the signal 1 to a predetermined degree, so as to distinguish between the reference pulse sequences representation of 0's and 1's.

8. A wireless data receiving apparatus comprising:
    a template pulse sequence generator which generates a reference template pulse sequence used to detect the start point of a received random-interval pulse sequence and generates a pulse sequence for a signal 0 and a pulse sequence for a signal 1;
    a random number sequence detector which receives the random-interval pulse sequence and detects information regarding the start point of a random number sequence used to generate the random-interval pulse sequence; and
    a comparator which compares the received random-interval pulse sequence with the pulse sequences for the signal 0 and the signal 1, which are generated by the template pulse sequence generator, based on the start point information detected by the random number sequence detector and determines whether the value of the received random-interval pulse sequence is 0 or 1.

9. The apparatus of claim 8, wherein the received random-interval pulse sequence is generated at a UWB.

10. The apparatus of claim 8, wherein the template pulse sequence generator generates the pulse sequences such that each pulse of the pulse sequence for the signal 0 are out of phase with each pulse of the pulse sequence for the signal 1 by a predetermined degree.

11. The apparatus of claim 8, wherein the template pulse sequence generator generates reference pulse sequences by adjusting the pulse width for the signal 0 to be different from the pulse width for the signal 1 to a predetermined degree, so as to distinguish between the reference pulse sequences representation of 0's and 1's.

12. A wireless data transmitting/receiving method comprising:
    (a) generating a random number sequence;
    (b) generating a random-interval pulse sequence for data, which is to be transmitted, using the random number sequence;
    (c) generating a reference template pulse sequence used to detect the start point of the received random-interval pulse sequence;
    (d) receiving the random-interval pulse sequence and detecting information regarding the start point of a random number sequence used to generate the received random-interval pulse sequence, using the reference template pulse sequence;
    (e) generating reference pulse sequences for a signal 0 and a signal 1 based on the start point information regarding the random number sequence; and
    (f) comparing the reference pulse sequences for the signal 0 and the signal 1 with the received random-interval pulse sequence and determining whether the value of the received random-interval pulse sequence is 0 or 1 based on the result of comparison.

13. The method of claim 12, wherein the random-interval pulse sequence is generated at a UWB.

14. The method of claim 12, wherein during (b), the random-interval pulse sequence is generated using pulse position modulation.

15. The method of claim 12, wherein during (c), the reference template pulse sequence is generated based on information regarding the same random number sequence as a transmitter uses to generate the random-interval pulse sequence.

16. The method of claim 12, wherein during (d), the start point information is detected by checking the degree of which the energy distribution of the spectrum of the received random-interval pulse sequence matches the energy distribution of the spectrum of the reference template pulse sequence and determining whether the degree of match exceeds a predetermined critical value.

17. The method of claim 12, wherein during (e), the reference pulse sequences are generated such that each pulse of the pulse sequence for the signal 0 is out of phase with each pulse of the pulse sequence for the signal 1 by a predetermined degree.

18. The method of claim 12, wherein during (e), the reference pulse sequences are generated such that the width of each pulse of the pulse sequence for the signal 0 is adjusted to be different from the width of each pulse of the pulse sequence for the signal 1 to a predetermined degree, so as to distinguish between the reference pulse sequences representation of 0's and 1's.

19. A wireless data receiving method comprising:
    (a) generating a reference template pulse sequence used to detect the start point of a received random-interval pulse sequence;
    (b) receiving the random-interval pulse sequence and detecting information regarding the start point of a random number sequence used to generate the received random-interval pulse sequence using the reference template pulse sequence;
    (c) generating reference pulse sequences for a signal 0 and a signal 1 based on the start point information regarding the random number sequence; and
    (d) comparing the reference pulse sequences for the signal 0 and the signal 1 with the received random-interval pulse sequence and determining whether the value of the received random-interval pulse sequence is 0 or 1.

20. The method of claim 19, wherein the random-interval pulse sequence is generated at a UWB.

21. The method of claim 19, wherein during (c), the reference pulse sequences are generated such that each pulse of the pulse sequence for the signal 0 is out of phase with each pulse of the pulse sequence for the signal 1 by a predetermine degree.

22. The method of claim 19, wherein during (c), the reference pulse sequences are generated such that the widths of pulses of the pulse sequence for the signal 0 are different from the widths of pulses of the pulse sequence for the signal 1 to a predetermined degree, so as to distinguish between the reference pulse sequences representation of 0's and 1's.

23. The data transmitting and receiving system of claim 1, wherein the template pulse sequence generator generates the pulse sequences, such that each pulse of the pulse sequence for the signal 0 is out of phase with each pulse of the pulse sequence for the signal 1 by a predetermined degree.

24. The data transmitting and receiving system of claim 1, wherein the template pulse sequence generator generates the pulse sequences, such that a width of each pulse of the pulse sequence for the signal 0 is adjusted to be different from a width of each pulse of the pulse sequence for the signal 1 to a predetermined degree, so as to distinguish between the reference pulse sequences representation of 0's and 1's.

25. The wireless receiving apparatus of claim 8, wherein the template pulse sequence generator generates the pulse sequences, such that each pulse of the pulse sequence for the signal 0 is out of phase with each pulse of the pulse sequence for the signal 1 by a predetermined degree.

26. The wireless receiving apparatus of claim 8, wherein the template pulse sequence generator generates the pulse sequences, such that a width of each pulse of the pulse sequence for the signal 0 is adjusted to be different from a width of each pulse of the pulse sequence for the signal 1 to a predetermined degree, so as to distinguish between the reference pulse sequences representation of 0's and 1's.

* * * * *